United States Patent
Hüppi et al.

(10) Patent No.: US 11,299,895 B2
(45) Date of Patent: Apr. 12, 2022

(54) METHOD FOR STRENGTHENING CONCRETE OR TIMBER STRUCTURES USING CFRP STRIPS AND CONCRETE OR TIMBER STRUCTURES STRENGTHENED BY THIS METHOD

(71) Applicants: S&P Clever Reinforcement Company AG, Seewen (CH); Eidg. Materialprüfungs- und Forschungsanstalt EMPA, Dübendorf (CH)

(72) Inventors: Martin Hüppi, Brunnen (CH); Ardalan Hosseini, Davis, CA (US); Niloufar Moshiri, Isfahan (IR); Davood Mostofinejad, Isfahan (IR); Christoph Czaderski, Gossau (CH); Masoud Motavalli, Rüschlikon (CH)

(73) Assignee: S&P Clever Reinforcement Company AG, Seewen (CH)

( * ) Notice: Subject to any disclaimer, the term of this patent is extended or adjusted under 35 U.S.C. 154(b) by 0 days.

(21) Appl. No.: 17/426,236

(22) PCT Filed: Jan. 27, 2020

(86) PCT No.: PCT/EP2020/051932
§ 371 (c)(1),
(2) Date: Jul. 28, 2021

(87) PCT Pub. No.: WO2020/157009
PCT Pub. Date: Aug. 6, 2020

(65) Prior Publication Data
US 2022/0042333 A1    Feb. 10, 2022

(30) Foreign Application Priority Data
Feb. 1, 2019  (EP) ..................................... 19155050

(51) Int. Cl.
*E04G 23/02*   (2006.01)
*C04B 41/53*   (2006.01)
(Continued)

(52) U.S. Cl.
CPC ...... *E04G 23/0218* (2013.01); *C04B 41/4501* (2013.01); *C04B 41/4853* (2013.01);
(Continued)

(58) Field of Classification Search
CPC ........ E04G 23/0218; E04G 2023/0248; E04G 2023/0259; E04G 2023/0262;
(Continued)

(56) References Cited

U.S. PATENT DOCUMENTS 6,385,940 B1    5/2002   Maier et al.
7,658,041 B2 *  2/2010   Andra ................. E04G 23/0218
                                                        52/223.14
(Continued)

FOREIGN PATENT DOCUMENTS

| | | |
|---|---|---|
| CN | 102425311 B | 4/2012 |
| DE | 19944573 A1 | 3/2001 |
| JP | H04285247 A | 10/1992 |

OTHER PUBLICATIONS

Written Opinion and International Search Report of PCT/EP2020/051932 dated Mar. 13, 2020.
(Continued)

*Primary Examiner* — Gisele D Ford
(74) *Attorney, Agent, or Firm* — Polsinelli PC (57) ABSTRACT

This method is suitable for the strengthening of concrete or timber structures by applying prestressed Carbon FRP or Glass FRP lamella. At least one groove is cut into the concrete or timber structure along the direction in which the concrete or timber structure is to be strengthened. The grooves are filled with epoxy resin and a layer of epoxy resin
(Continued)

is put onto the entire section to be equipped with the CRFP or GFRP lamella. The lamella is prestressed and anchored at both ends. U-shaped brackets are then being put over the two end sections of the CFRP or GFRP lamella by inserting and submerging its both U-legs into holes filled with resin as well. These holding brackets are then tightly pressed onto the CFRP or GFRP lamella to prevent cracking or fracture of the concrete or timber and bending away of the extremities of the CFRP or GFRP lamella.

7 Claims, 9 Drawing Sheets

(51) Int. Cl.
    *C04B 41/48*     (2006.01)
    *C04B 41/45*     (2006.01)
    *E04C 3/18*     (2006.01)
    *E04C 3/26*     (2006.01)
    *C04B 41/52*     (2006.01)

(52) U.S. Cl.
    CPC ............ *C04B 41/522* (2013.01); *C04B 41/53* (2013.01); *E04C 3/185* (2013.01); *E04C 3/26* (2013.01); *E04G 2023/0248* (2013.01); *E04G 2023/0259* (2013.01); *E04G 2023/0262* (2013.01)

(58) Field of Classification Search
    CPC ............ C04B 41/4501; C04B 41/4853; C04B 41/522; C04B 41/53; E04C 3/185; E04C 3/26

See application file for complete search history.

(56) References Cited

U.S. PATENT DOCUMENTS

| | | | | |
|---|---|---|---|---|
| 8,349,109 | B2* | 1/2013 | Al-Emrani | E04C 5/085 |
| | | | | 156/71 |
| 8,881,493 | B2* | 11/2014 | Ruegg | E04G 23/0218 |
| | | | | 52/745.21 |
| 9,068,365 | B2* | 6/2015 | Berset | E04G 23/0218 |
| 10,689,870 | B2* | 6/2020 | Wu | E04C 5/12 |
| 2011/0072745 | A1* | 3/2011 | Pantelides | E01D 19/16 |
| | | | | 52/223.13 |
| 2011/0197540 | A1* | 8/2011 | Pantelides | E04C 5/127 |
| | | | | 52/698 |

OTHER PUBLICATIONS

English Abstract of CN102425311B retrieved from https://worldwide.espacenet.com/patent/ on Jun. 23, 2021.
English Abstract of DE19944573A1 retrieved from https://worldwide.espacenet.com/patent/ on Jun. 23, 2021.
English Abstract of JPH04285247A retrieved from https://worldwide.espacenet.com/patent/ on Jun. 23, 2021.

* cited by examiner

METHOD FOR STRENGTHENING CONCRETE OR TIMBER STRUCTURES USING CFRP STRIPS AND CONCRETE OR TIMBER STRUCTURES STRENGTHENED BY THIS METHOD

CROSS-REFERENCE TO RELATED APPLICATIONS

This application is a national stage application of International Application Number PCT/EP2020/051932, which was filed on Jan. 27, 2020, which claims priority to European Application Number 19155050.8 filed on Feb. 1, 2019, each of which is incorporated by reference in its entirety.

BACKGROUND

Carbon Fiber Reinforced Polymer (CFRP) is an advanced non-metallic composite material made of a polymer resin reinforced with carbon fibers. It has many superior performances, such as high strength, light weight, no corrosion and high fatigue endurance. Thus, CFRP possesses a great potential to be made into reinforcements such as cables or strips, and be substituted for conventional steel cables or steel plate reinforcements in structures which may considerably promote their development.

As the name suggests, unidirectional Carbon Fiber Reinforced Polymer (CFRP) is composed of carbon fibers embedded in parallel arrangement, that is with unidirectional CFRPs, in a polymer resin, in which the carbon fibers act as the reinforcement material and the polymer resin functions as the matrix to hold the fibers together.

Therefore, unidirectional CFRP has great potential for cables and to replace steel cables in cable structures. However, CFRP is a typical orthotropic material. Its strength and modulus perpendicular to the fiber direction is only approximately 30 Mega Pascal while a cable or a flat band of CFRP fibers, parallel to the fiber's direction, can carry some 2500-3000 Mega Pascal of tensile stresses. By comparison, an isotropic high strength steel rod, at maximum, can only take approximately 1800 Mega Pascal. These properties of CFRP cables and bands entail a challenge for their anchoring.

A cable or band structure can be defined as a structure in which a cable or a band or a system of cables or bands is being used as the visible and primary load bearing structural element, or as an auxiliary means for the strengthening or retrofitting of such structures. Such CFRP continuous cables and bands are being used for the strengthening of new or existing concrete structures.

Carbon fibers refer to fibers which contain at least 90 weight % and up to 100 weight % carbon. They can be produced from polymeric precursor materials, such as polyacrylonitrile (PAN), cellulose, pitch and polyvinylchloride. These precursors are converted into carbon fibers through a series of treatment operations of heating and tensioning. From a macro perspective, carbon fibers are very thin filaments (about 5-10 μm in diameter) which are just visible to the human eye and about 5 times thinner than a human hair.

After decades of development, there are now a variety of carbon fibers with different strengths and moduli available on the market. The mechanical properties of three types of commonly used carbon fibers (CF) are listed below, compared with two typical steel materials:

| Material type | Density ρ (kg/m3) | Tensile Strength $\delta_u$(GPa) | Elastic Modulus E(GPa) | Breaking Length $\delta_u/(\rho g)$ (km) |
|---|---|---|---|---|
| CF Standard | 1760 | 3.53 | 230 | 205 |
| CF High strength | 1820 | 7.06 | 294 | 396 |
| CF High modulus | 1870 | 3.45 | 441 | 188 |
| Steel S355 | 7850 | 0.50 | 210 | 6 |
| Steel wire | 7850 | 1.77 | 210 | 23 |

The tensile strengths of all carbon fibers are higher than those of steel materials, typically used in structural applications, while their densities are much lower. The breaking length is a good parameter to show the high strength and lightweight characteristics of certain materials. It is defined as the maximum length of a hanging bar that could suspend its own weight and can be calculated by $\delta_u/(\rho g)$, where g is the standard gravity constant of 9.8 m/s². The breaking lengths of carbon fibers are one order of magnitude larger than those of steel materials.

For applying CFRP on buildings and structures, polymer resins are being used for gluing the CFRP to the structural members, in the form of thermosetting resins. Thermosetting resins are polymers joined together by chemical bonds, forming a highly cross-linked molecular structure. This cross-linked structure can greatly restrict the motion of molecular chains which makes the thermosets unmeltable and intractable upon the application of heat after curing. The molecular structures of these two polymer resins are illustrated below:

| Name | Density ρ (kg/m³) | Tensile Strength $\delta_u$(GPa) | Elastic Modulus E (GPa) |
|---|---|---|---|
| Thermoplastics: | | | |
| Polyethersulfone | 1370 | 0.084 | 2.4 |
| Polyetherether ketone | 1310 | 0.070 | 3.8 |
| Polyetherimide | 1270 | 0.105 | 3.0 |
| Thermosetting: | | | |
| Orthophthalic polyester | 1350 | 0.070 | 3.2 |
| Thermosetting Vinylester | 1250 | 0.075 | 3.3 |
| Epoxy | 1250 | 0.115 | 3.0 |

The densities of polymer resins are slightly less than those of carbon fibers, while the strengths and moduli of carbon fibers are orders of magnitude greater than those of polymer resins. However, due to the filamentary nature of carbon fibers, they cannot be applied as independent engineering materials and have to be used in the synergistic fashion with a polymer resin to realize their superior mechanical properties. The differences of strength and modulus between the carbon fiber and the polymer resin make CFRP a typical orthotropic material. In the fiber direction, CFRP mainly exhibits the mechanical properties of the carbon fiber, i.e., relatively high strength and high modulus. But in the direction perpendicular to the fiber axis, CFRP mainly exhibits the mechanical properties of the polymer resin, i.e., relatively low strength and low modulus. This pronounced orthotropy of CFRP cables and CFRP bands makes them difficult to be properly anchored.

In the construction industry, the first practical utilization of CFRP took place in 1991 for strengthening the Ibach Bridge in Lucerne, Switzerland. From then on, more and more CFRP products were used, not only in strengthening, retrofitting, repairing, reinforcing, prestressing, but also as cables in cable structures. Usually, unidirectional CFRP materials are used to manufacture CFRP cables. The mechanical properties along the fiber direction of CFRPs, such as the tensile strength $\delta_u$ and the elastic modulus E, are usually approximately 60% of those of the carbon fibers because the fiber volume fraction is usually 60%. According to the different structural forms, the existing CFRP reinforcements can be classified into four main types:

(a) CFRP lamella
(b) CFRP strip-loop
(c) CFRP rod
(d) CFRP wire-strand

Of particular interest for the strengthening of concrete or timber structures are the CFRP lamella which can be fabricated by pultrusion or lamination, made from standard carbon fibers with an approximate 60% fiber volume. Here are the properties of such CFRP lamellae:

| name (flat strip) | Density ρ (kg/m³) | Tensile strength $\delta_u$(GPa) | Elastic Modulus E (GPa) |
|---|---|---|---|
| Pultruded DPP CFRP lamella | 1600 | 2.5 | 160 |

In addition to high strengths and low weights, CFRP lamellae have better corrosion resistance and fatigue endurance than those of e.g. steel plate reinforcements. Furthermore, because carbon fibers have excellent creep resistance, the stress relaxation of CFRP composites is negligible, and therefore, the level of service stresses acting on the CFRPs can be much higher than that of the steel reinforcements. Aside the advantages mentioned above, CFRP lamellae have also some disadvantages. They are relatively expensive, while difficult to be properly anchored for transferring their high tensile capacity to the existing structures. These certain limitations may have negative effects on the vast application of such CFRP lamellae.

In practical applications, the limitation was so far the transmission of the enormous tensile force of CFRP lamellae into the concrete structure. The epoxy resin does nicely adhere to the concrete. However, due to the lower tensile strength of concrete (compared to the epoxy adhesive), the failure takes place in the top surface layer of the concrete substrate. This phenomenon, known as "debonding", strongly limits the utilization of the high tensile strength of CFRP reinforcements. Another effect that has been observed is that the debonding takes place primarily at the end sections of a CFRP lamella which is glued and bonded to a concrete substrate. Therefore, these end sections become loose and will then bend away from the concrete surface and the CFRP lamella completely separates from the concrete structure.

Active strengthening of concrete structures using CFRP lamellae in a prestressed state has the advantages that the existing deformations, strains and permanent stresses acting on the member can be reduced. Furthermore, the existing cracks under service loads can be closed. In other words, prestressed strengthening can reduce the undesired effects of sustained actions (due to dead load for instance), and therefore, the serviceability state of the structure can be certainly enhanced. If a CFRP lamella is applied in unstressed state, it has only an effect on the loads which are applied later on. Furthermore, prestressing has the effect that material of the CFRP lamellae are better utilized, because the strains at ultimate limit state are much higher compared to the unstressed case. However, the problems described above, namely debonding from the concrete surface and end anchoring, are for the prestressed CFRP lamellae even more pronounced, due to the fact that the forces are higher. Therefore, methods to improve the bond characteristics between CFRP lamellae and concrete surface are needed. Similarly, Glass Fibre Reinforced Polymer (GFRP) lamellae have also convincing properties and can be advantageous for the strengthening of concrete or timber structures in special cases, owing to their lower price compared to CFRPs. Generally, GFRPs do not exhibit excellent mechanical properties. Elastic modulus and strength are far less than those of CFRP and even high strength steel, and they cannot be used for prestressed applications due to a phenomenon called "creep rupture" under sustained load, but as appropriate, GFRP may be used in some circumstances.

The object of this invention is to disclose a method for the efficient and advanced application of prestressed CFRP lamellae on concrete or timber structures in order to strengthen such concrete or timber structures with better quality and in particular to prevent a debonding and bending away of the end sections of the CFRP lamellae, and also to define such concrete or timber structures which are strengthened using the aforementioned method.

The solution is provided by a method for the strengthening of concrete or timber structures by the application of prestressed CFRP lamellae which are being glued and bonded to the concrete or timber structure using an epoxy resin, characterized in that the following steps are executed:
  a) cutting at least one groove into the concrete or timber structure along the direction in which the concrete structure or timber structure is to be strengthened,
  b) filling the at least one groove tightly with epoxy resin and putting on a layer of epoxy resin onto the section area to be equipped with a CFRP lamella,
  c) putting on a CFRP lamella onto the epoxy layer and pressing the same against the concrete or timber structure,
  d) prestressing the CFRP lamella between two clamping devices fixed in the concrete or timber structure by a hydraulic jack by pushing the clamp device away from an anchored frame and inserting spacers (distance holders) between the clamp device and the anchored frame on each end section of the CFRP lamella,
  e) drilling a pair of holes into the concrete or timber structure beside each end section of the CFRP lamella, and filling the same with epoxy resin, and putting U-shaped brackets over the two end sections of the CFRP lamella by inserting and submerging the both U-legs into the epoxy resin filled opposite holes so the third intermediate U-leg will tightly lay on the CFRP lamella, and pressing the intermediate U-leg onto the CFRP lamella until the epoxy resin is hardened out,
  f) after hardening out of the epoxy resin, using the hydraulic jack for again pushing the clamping device away from the frame for removing the spacers, and then carefully releasing the prestress force on both ends of the CFRP lamella, and then removing the clamping devices and frames and cutting the end sections of the CFRP lamella not glued to the concrete or timber structure away.

The concrete or timber structure which is strengthened using said method is characterized in that the section onto which the CFRP lamella is glued is equipped with at least one groove positioned in the width of the section and extending in the direction of the CFRP lamella, and which groove is entirely filled and the entire section is equipped with a layer of epoxy resin, and the end sections of the CFRP lamella are in addition tightly held to the concrete or timber structure by down pressing U-shaped brackets anchored in the concrete on both sides of the end sections of the CFRP lamella.

BRIEF DESCRIPTION OF THE DRAWINGS

In the following descriptions, firstly, the conventional method for using CFRP or GFRP lamellae as strengthening means for concrete or timber structures is being explained by way of figures and the shortcomings of this method are discussed. Secondarily, the improved method according to this invention is described in detail and its advantages are discussed.

Shown is in:

FIGS. 7 (a) to (i) Nine pictures with sequential views of the progress of preparing a concrete structure for mounting a CFRP lamella as strengthening strip according to the invention;

DETAILED DESCRIPTION

Currently, several prestressing and anchorage systems for CFRP lamellae or strips are available on the market. In general, they foresee a mechanical anchorage at the strip ends. In most cases, the external strengthening strip is prestressed against the existing concrete or timber structure. To do so, a hydraulic jack is installed in a frame element and fixed on the concrete or timber structure by means of several dowels and screws. The lamella is usually held in a mobile clamping system which will be pushed towards the end anchor on the structural element ends which results in prestressing the lamella.

Figure 1:
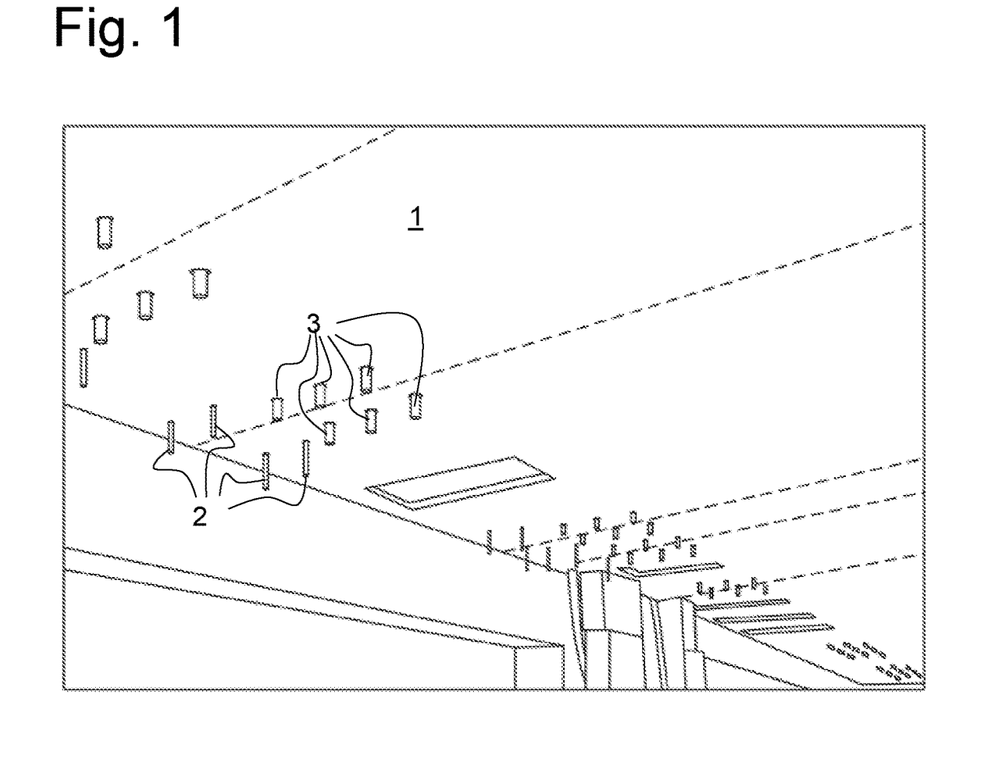
FIG. 1: A concrete slab prepared with a number of dowels and screws for fixing the mechanical clamps and the prestressing devices.

FIG. 1 shows a prepared concrete slab 1 to be equipped with a number of parallel strengthening CFRP strips in the form of CFRP lamellae which are to be placed along the dotted lines. Shown is the prepared side for attaching of the strips to be placed with their one end in the conventional manner. Four dowels and screws 2 are placed into the ceiling 1 for the anchoring profiles and the clamping device, and six dowels and screws 3 are placed for the mounting of a frame to receive a hydraulic jack as the prestressing device. At the other end—outside the present drawing on its right side—the same devices are used.

Figure 2:
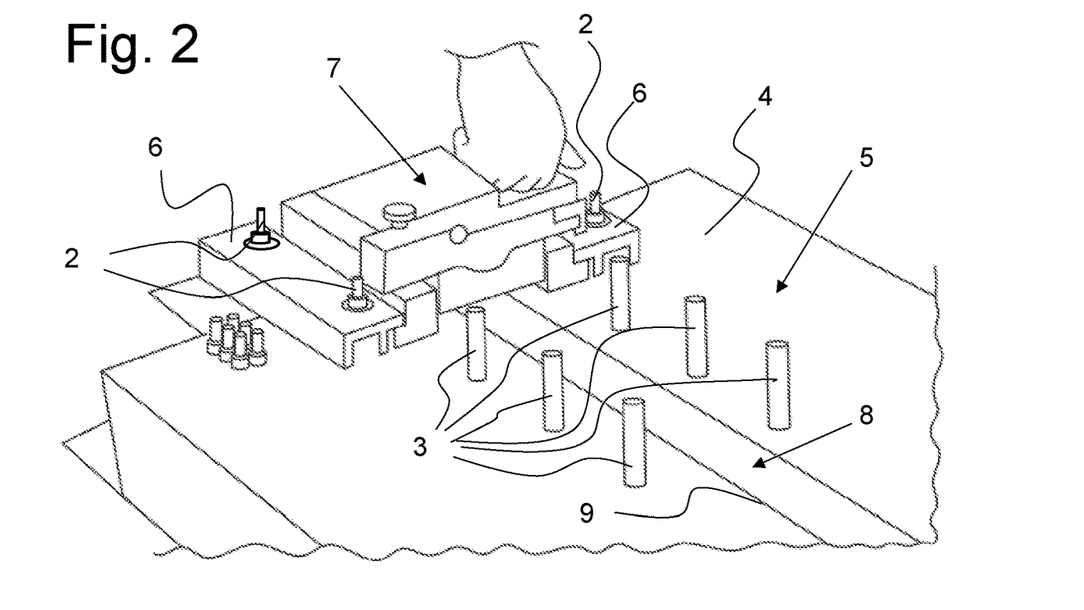
FIG. 2: The mechanical clamps already mounted on four holding screws and six screws for the prestressing device in front, all mounted on the side of a concrete beam that has to be strengthened.

The further working steps are now shown in an upside down view, on a concrete beam/slab 4 or timber beam laying on the ground as shown in FIG. 2, and which will be reinforced on its upper side 5 in the drawing. The same procedure can be applied in case of a timber beam, either using a CFRP lamella or in some cases GFRP. Anchoring angle profiles 6 are put over the four screws 2 left land right of the strip. Said anchoring angle profiles 6 hold the clamping device 7 in place so that it can slide along the direction of prestressing. In front of the anchoring angle profiles 6 there are six dowels and screws 3 for receiving an anchor plate of the prestressing device yet to be mounted but which will no longer be needed with the present invention. Between the two rows of screws 3, the CFRP or GFRP lamella 8 with a typical width of 100 mm and a typical thickness of approx. 1.2 to 1.4 mm does extend along the prestressing direction. Said CFRP or GFRP lamella 8 lays on a layer of epoxy resin 9.

Figure 3:
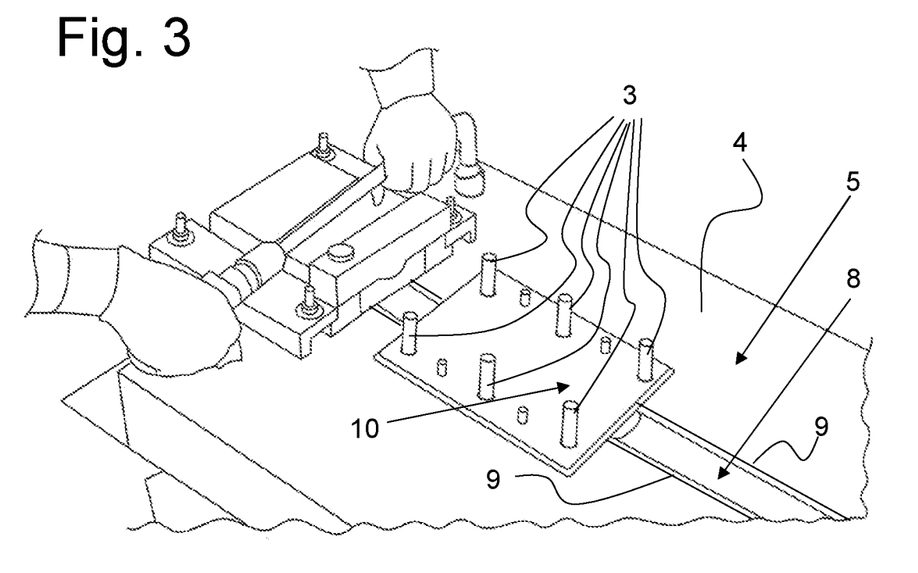
FIG. 3: The tightening of the anchor plate with nuts and the ground plate for the prestressing device laid over the six screws.
Figure 4:
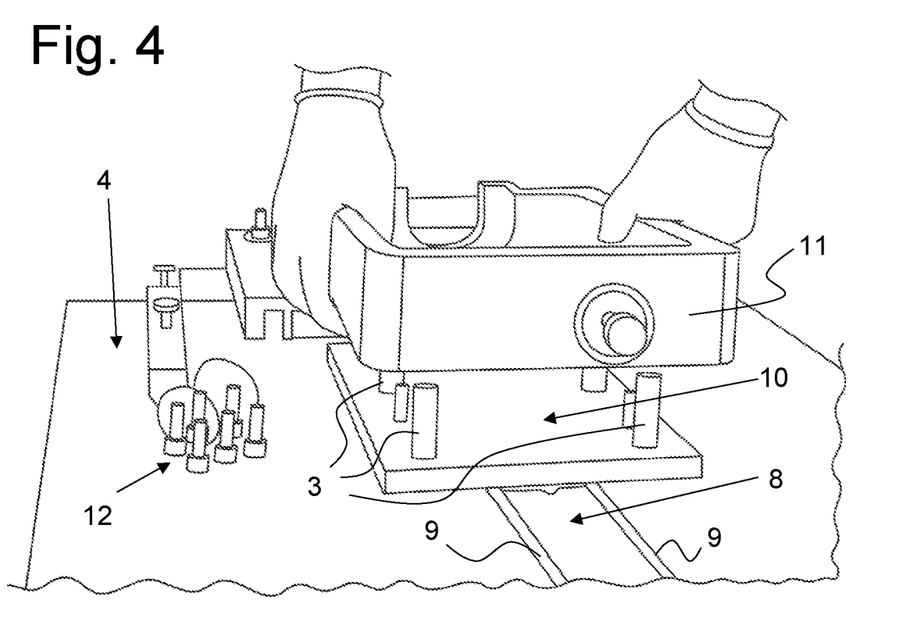
FIG. 4: The mounting of a steel frame for fixing the prestressing device in the form of a hydraulic jack (not shown)

FIG. 3 shows the situation after the previous step. An anchor plate 10 is now mounted over the six screws 3 which allow to strongly fix said ground plate 10 on the concrete slab 4 and to transfer substantial tensile forces into the concrete beam/slab 4 in the direction of the CFRP or GFRP lamella 8 to be tensioned or prestressed. Such anchor plate 10 is advantageously made of aluminum, but also a steel plate will do it. FIG. 4 shows the mounting of a steel or aluminum frame 11 over the six screws 3 which extend on the upper side of the anchor plate 10, and upon the same. The frame 11 will be fixed to the anchor plate 10 by way of the nuts 12 laying on the concrete slab 4 as shown, ready to be picked up for mounting and tightening on the inner side of the frame 11 on the screws 3.

Figure 5:
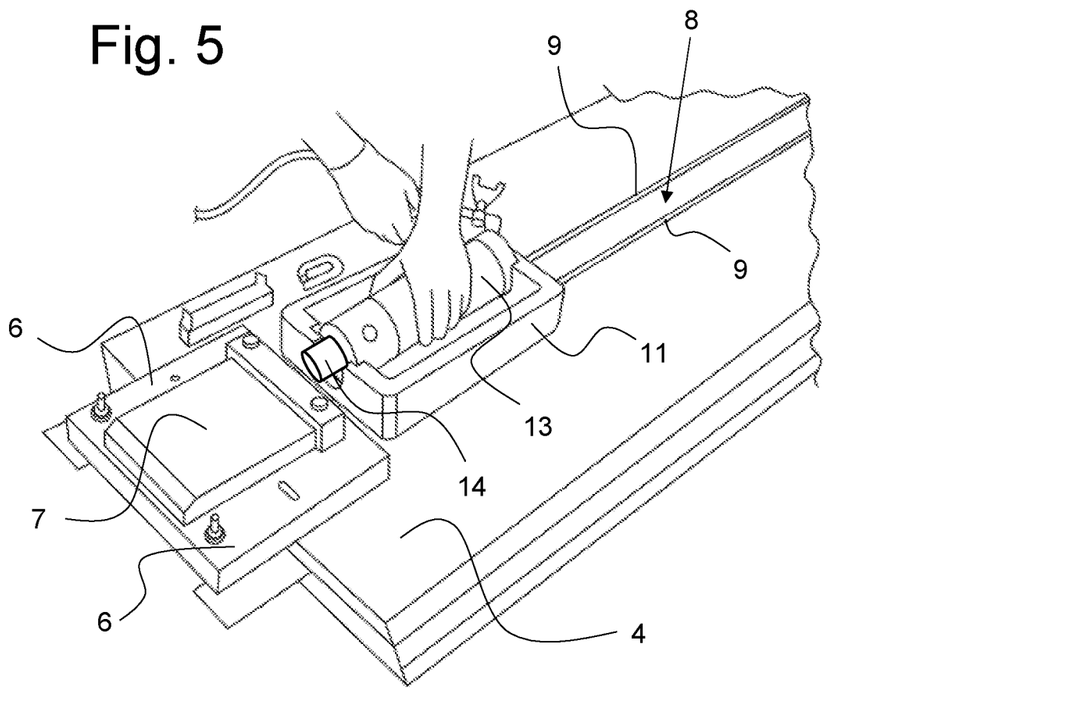
FIG. 5: The mounting of the hydraulic jack for prestressing into the steel or aluminum frame of the prestressing device.
Figure 6:
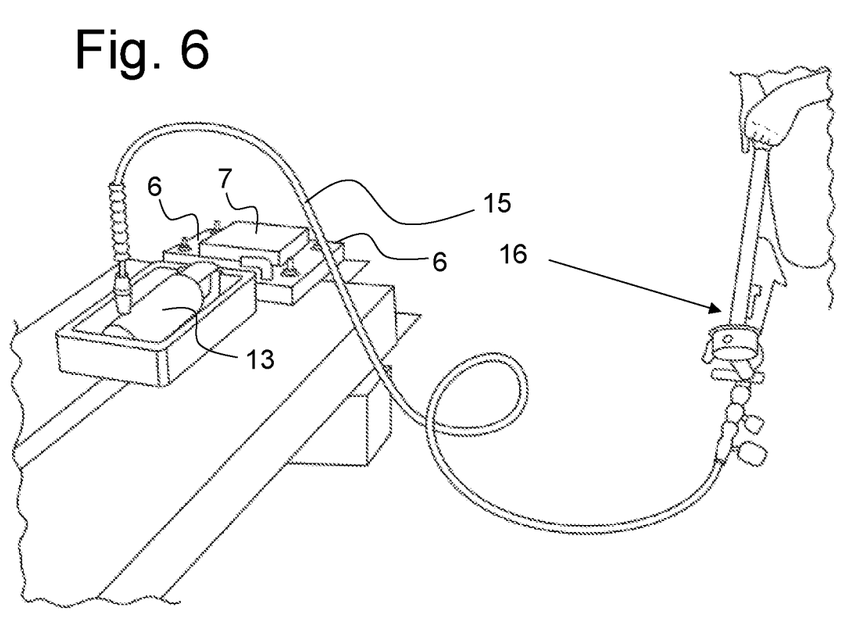
FIG. 6: The prestressing by actuating the hydraulic jack using a hydraulic hand pump, for moving its piston against the clamp device in order to prestress the CFRP lamella.

In FIG. 5, the hydraulic jack 13 is being mounted into the steel frame 11 in which it is being fixed and tightly hold and secured against any forces, above all in the prestressing direction, that is in the direction of the CFRP or GFRP lamella 8 which traverses the steel frame 11 and its anchor plate 10 underneath and is strongly clamped in the clamping device 7. Here, the piston 14 of the hydraulic jack 13 is visible and is extending towards the clamping device 7 to press on it. In FIG. 6, the hydraulic jack 13 is connected over a hydraulic hose 15 with a hydraulic pump 16, here in the form of a hand operated hydraulic pump 16. While prestressing, the clamping device 7 will slightly move within the angle profiles 6 to reach the desired prestressing level, and then, kept in place during the adhesive curing as distance holders will be inserted between the frame 11 and the clamping device 7, in order to be able to remove the hydraulic jack 13 and use it elsewhere. Once the epoxy resin has cured and reached a minimum strength—after approximately 24 hours—the hydraulic jack 13 is again being used to press against the clamping device 7 for loosening the distance holders which then can be taken away. After that, the frame 11 can be removed as well, and also the angle profiles 6 and the clamping device 7. The end section of the strip which is not tightly bonded to the concrete 4 is being cut away and then, only the anchor plate 10 remains. As a last step, the emerging screws 3 are cut even with the anchor plate 10.

So far, this is the conventional way of gluing and prestressing and securing such CFRP or GFRP lamellae on concrete structures. The shortcomings of this arrangement are these: Firstly, the transmission of the applied forces from the prestressed CFRP or GFRP strip 8 into the concrete structure 1, 4 over the epoxy layer 9 proves to be too weak in many cases. Therefore, the tensile capacity of the CFRP or GFRP lamellae 8 cannot be fully utilized. In borderline cases, the top concrete layer fails and the entire CFRP or GFRP reinforcement detaches away from the concrete member. Moreover, this effect predominately occurs at the end sections of the CFRP or GFRP lamellae 8 mounted, since in these sections, the transmission forces reach their maximum. In case the top layer fails, these end sections of the strips 8 are loosened from the concrete structure and then bend away from it since in the top layer of the CFRP or GFRP lamellae 8, greater tensile forces are still active than in the lower layers close to the side of the concrete structure 1, 4. Hence, the end sections bend away from the surface of the concrete.

Figure 7:
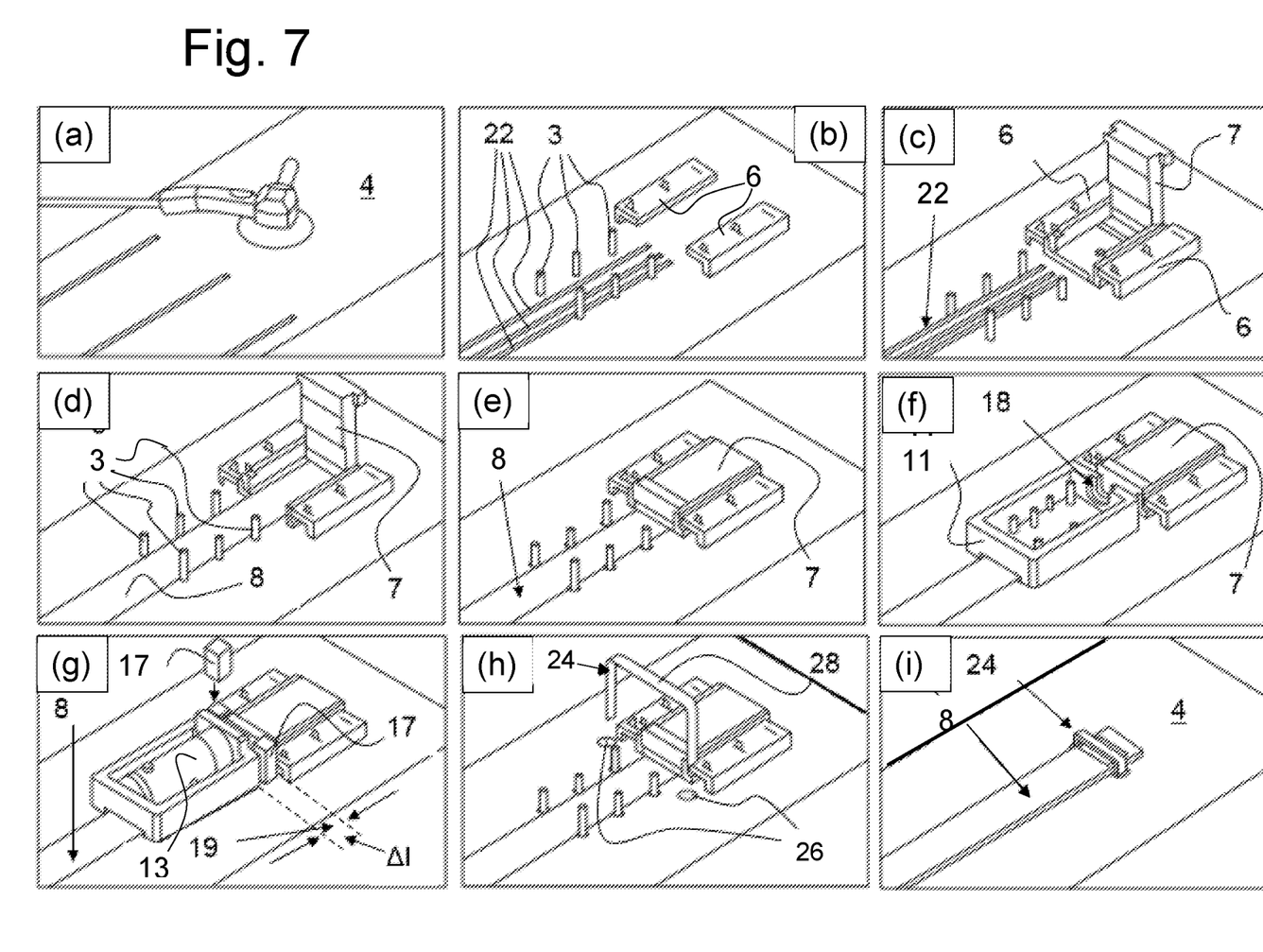

FIGS. 7 (*a*) to (*i*) illustrate the entire method after the invention step by step, which differs from the method described so far, for preparing a concrete structure or slab for mounting a CFRP or GFRP lamella as a strengthening method. In FIG. 7(*a*) it is shown how the surface of the concrete structure 4 can be leveled and/or grinded, if needed. One or several grooves 22 are cut into the concrete structure 4 in order to increase the bond area in comparison with a structure without grooves 22. By this measure, the bond area can be doubled or even more if the grooves 22 are deep enough. Therefore, CFRP or GFRP stresses can be better transferred into the deeper layers of concrete, and consequently, the CFRP- or GFRP-to-concrete bond strength can be increased substantially. Such grooves can be cut using a conventional circular saw machine.

As shown in FIG. 7 (*b*), three parallel grooves 22 have been cut out in the area where the strip is to be put on. The grooves are then cleaned with a vacuum cleaner or air jet and will then be thoroughly filled with epoxy resin. At the left and right extremities of these grooves 22, three dowels and screws 3 are mounted for the later installation of a prestressing device. Beyond the end of the grooves 22, two angle profiles 6 are anchored by screws for receiving the clamping device 7 which can glide along these profiles 6 in longitudinal direction. In FIG. 7 (*c*) the clamping device 7 has been inserted into the profiles 6 and swiveled open to receive the end of the strengthening CFRP or GFRP strip, between its two clamping plates. In FIG. 7 (*d*), the CFRP or GFRP lamella 8 is laid in between the six screws 3 and leads into the clamping device 7. Next, as shown in FIG. 7 (*e*), the clamping device 7 is closed and does now tightly squeeze the CFRP or GFRP lamella 8. Next, as shown in FIG. 7 (*f*), a steel frame 11 is put onto the six screws 3 and is tightly screwed onto the same for creating a strong mechanical support for the hydraulic jack, which can then absorb any forces applied by the piston of the hydraulic jack and introduce or transmit the reaction forces via the screws 3 into the concrete slab 4 or concrete structure. There is a recess 18 in the steel frame 11 for receiving the piston of the hydraulic jack.

In FIG. 7 (*g*), the hydraulic jack 13 is inserted into the frame 11. The arrow 19 points to the indication of the distance $\Delta l$ over which the piston of the hydraulic jack 13 can move and press onto the clamping device 7 for prestressing the CFRP or GFRP lamella 8 which is tightly clamped into the clamping device 7. Consequently, the clamping device 7 will slightly move a few mm to the right side in the picture until the strip 8 reaches the desired prestressing force. Optionally, the same prestressing can be performed on the opposite end of the strip 8, with the same angle profiles 6, clamping device 7 and frame 11 put in place. By pressing the piston onto the clamping device 7, the latter will slightly move in relation the frame 11 and angle profiles 6 and once the predetermined prestress is achieved, the clamping device 7 can be secured and fixed relative to the frame 11 and the angle profiles 6. For this purpose, distance holding elements in the form of distance spacers or blocks 17 are inserted between the frame 11 and the clamping device 7 in order to keep the tensioning until the epoxy resin is fully hardened out which will be the case after approx. 24 hours. Once these distance blocks 17 are inserted and put in place, the piston of the hydraulic jack can be released and the entire hydraulic jack 13 can be removed from the frame 11 for use at another location. Right after, as shown in FIG. 7 (*h*), a U-shaped holding bracket 24 with its two legs is inserted into two opposite holes 26 in the concrete which are filled with epoxy resin until the middle leg 28 of the bracket does lay tightly on the strip 8. Then the epoxy resin can be cured, while the CFRP lamella is kept prestressed. After such period, the hydraulic jack is again put into the frame 11 and the piston can then push the clamping device 7 slightly and thereby loose the seat of the distance blocks 17. These blocks or spacers 17 can be then removed, the piston can be released again and the hydraulic jack 13 can be removed. Also the frame 11 can now be removed. Ultimately, the clamping device 7 and the angle profiles 6 are removed. In the end, the end section of the strip which is not bonded to the concrete is cut away and also the six and four screws 2, 3 that extend from the concrete surface are cut away and then the end situation as shown in FIG. 7 (*i*) is obtained.

Figure 8:
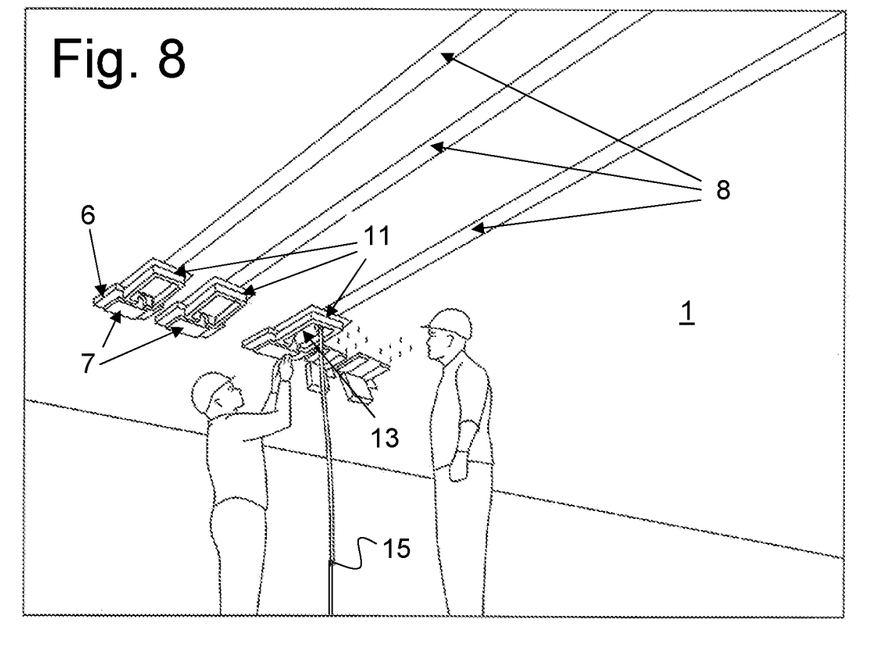
FIG. 8: Two strengthening strips on a concrete slab or timber beam prestressed, before removing the frames and anchors with clamping devices, and beside another a third strip while it is being prestressed.

In FIG. 8 a concrete slab 1 is shown which is equipped with two parallel CFRP or GFRP lamellae 8 which are already prestressed, and the prestressing force is kept constant during the curing of the epoxy resin. After complete hardening of the epoxy-resin, the steel frame 11 and the clamp device 7 and also the angle profiles 6 can be removed and screws can be cut even with the slab. The third CFRP or GFRP lamella 8 shown beside the first two is in the progress to be prestressed by the hydraulic jack 13 inserted into the steel frame 11. The hydraulic hose 15 hangs to the ground where the hydraulic hand pump is located. The pressure of the hydraulic oil can be measured by a manometer at the pump and gives a fair indication of the force acting over the piston of the hydraulic jack 13 onto the clamping device 7.

Figure 9:
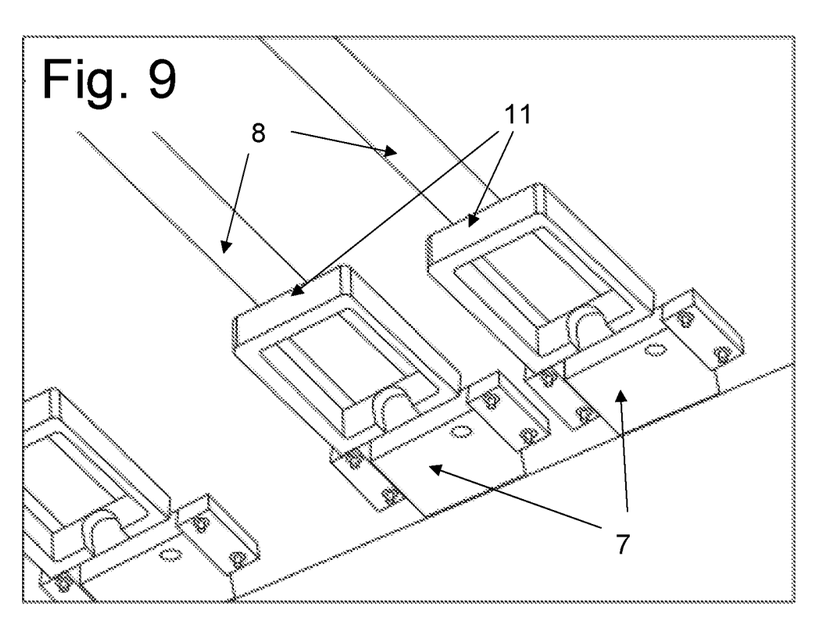
FIG. 9: Two installed and already prestressed CFRP strips fixed in the clamps during curing of the adhesive after removing the hydraulic jack and before removing the steel or aluminum frames.

In most cases, visual inspection by measuring the elongation on predefined marks on the lamella and concrete surface is used to double-check the stress level of the strip. In FIG. 9 two installed CFRP or GFRP lamellae 8 are shown during curing of the adhesive. The clamp devices 7 are securely fixed and the prestressing force in CFRP or GFRP lamellae 8 are kept constant by means of the spacer blocks (not shown) inserted between the clamp devices 7 and the frames 11 and fix it during the curing of the adhesive over one or two days. After concluding the prestressing application, the main components that comprise the system, including the clamp devices 7, must remain for at least 24 h to assure a minimum hardening out and cure of the epoxy adhesive. After this period of time, the hydraulic jack is inserted again into the frames 11 in order to compensate the tensile force applied to the clamp device 7 for releasing the spacer blocks so they can be removed. After this, all elements can be disassembled and removed, such as the frame 11, the angle profiles 6 and the clamping device 7, and the bolts or screws can be cut away. The extremities of the CFRP or GFRP lamella 8 (the end section which is not bonded to the concrete) can be cut away.

Figure 10:
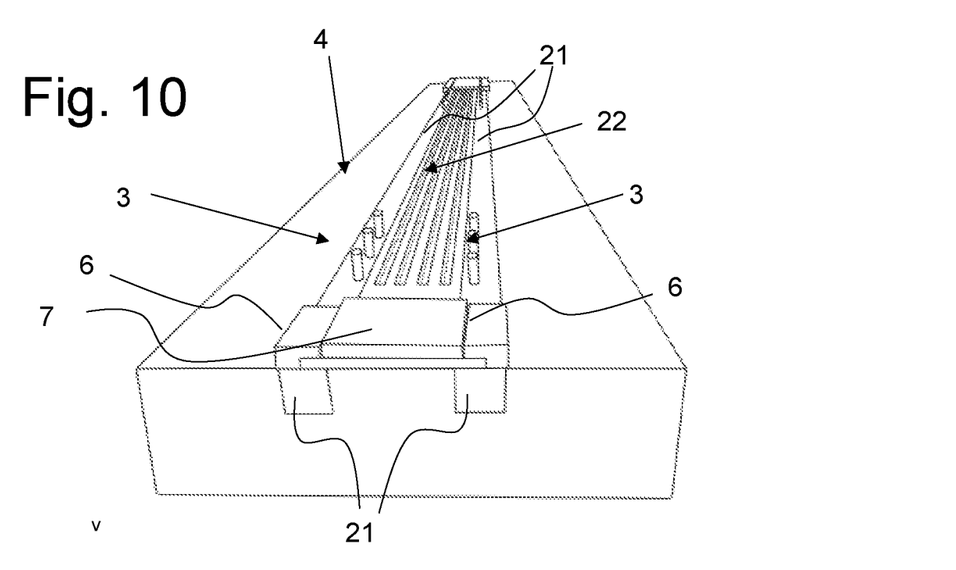
FIG. 10: A concrete slab with four cut out parallel longitudinal grooves for receiving epoxy resin over a section to be covered by a CFRP lamella to lay on, and the clamping devices and screws for the frames at both ends.

FIG. 10 shows the first crucial technical measure of the invention for increasing the transmission of the forces from the CFRP or GFRP lamellae 8 into the concrete structure 4 in general, i.e. to increase the bond strength of the CFRP- or GFRP-to-concrete surface. This measure is shown here on a concrete test beam 4 instead of a concrete slab. But the principle remains of course the same. On this concrete beam 4, two adhesive tapes 21 mark the section to be equipped with a CFRP or GFRP lamella. Now, the important and defining features are the grooves 22 which are cut out of the top concrete layer of this beam 4. In the example shown, four parallel grooves 22 are cut out of this top layer in between the set screws 3 for the prestressing apparatus and the clamping device 7 in its angle profiles 6. Depending on the demand and width of the lamellae to be mounted, a single groove 22 may be sufficient. In general, such groove 22 or such two or more grooves 22 enlarge the bond area surface substantially. With four grooves 22 e.g. of equal depths and widths and remaining ribs, a double surface for the adhesion is obtained. These grooves 22 can be cut out using a conventional circular saw machine. In general, the contribution of the grooves to the adhesion is that high, that a grinding of the concrete surface is no longer needed.

Figure 11:
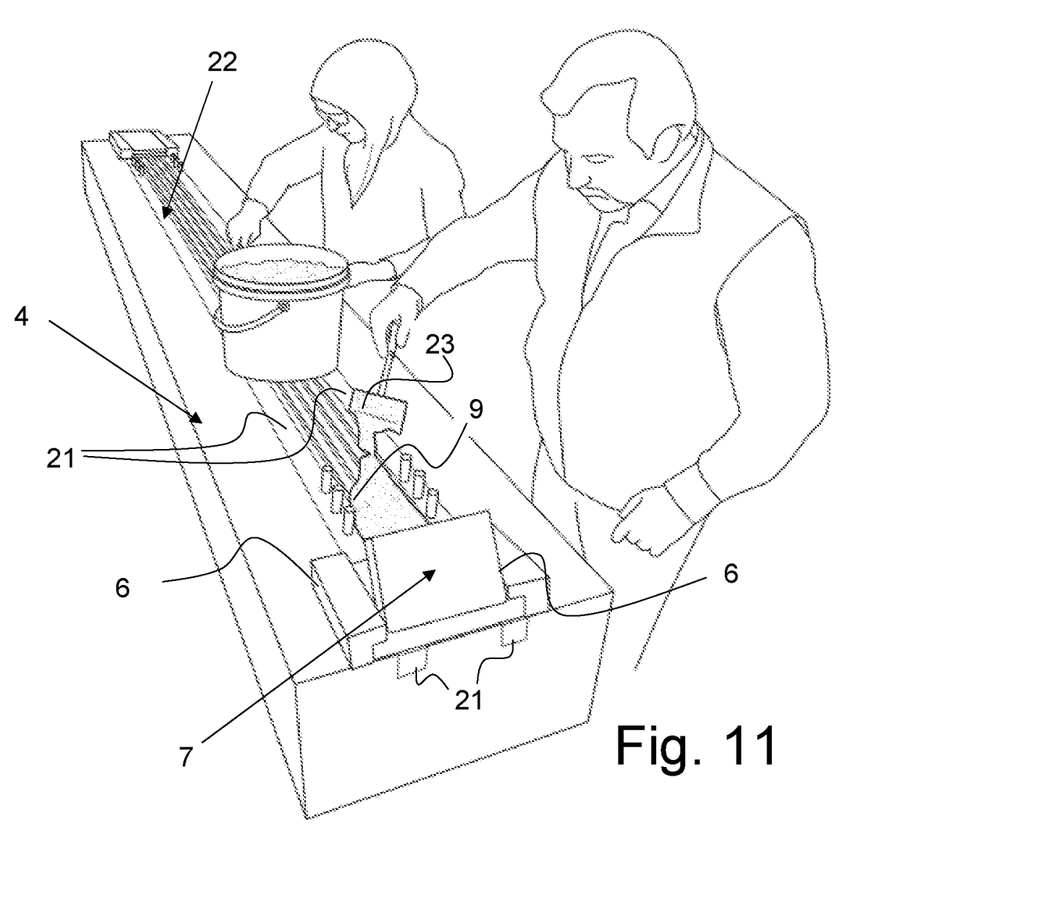
FIG. 11: The filling of the grooves and putting on epoxy resin onto the section to be equipped with the CRFP lamella.
Figure 12:
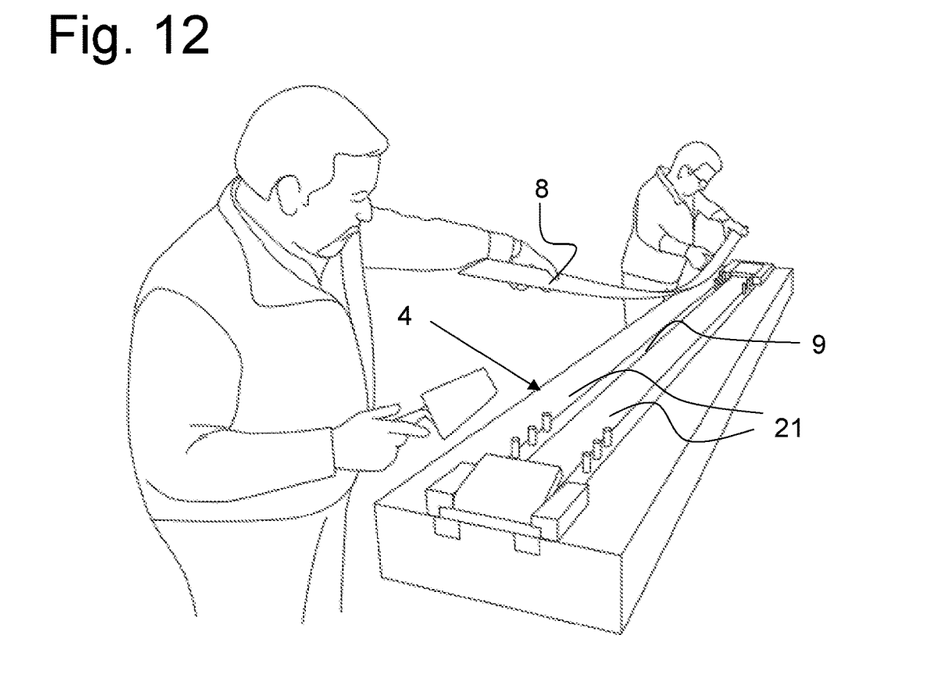
FIG. 12: The laying on of an unstressed CRFP (or GFRP) lamella onto the section with the epoxy resin layer.
Figure 13:
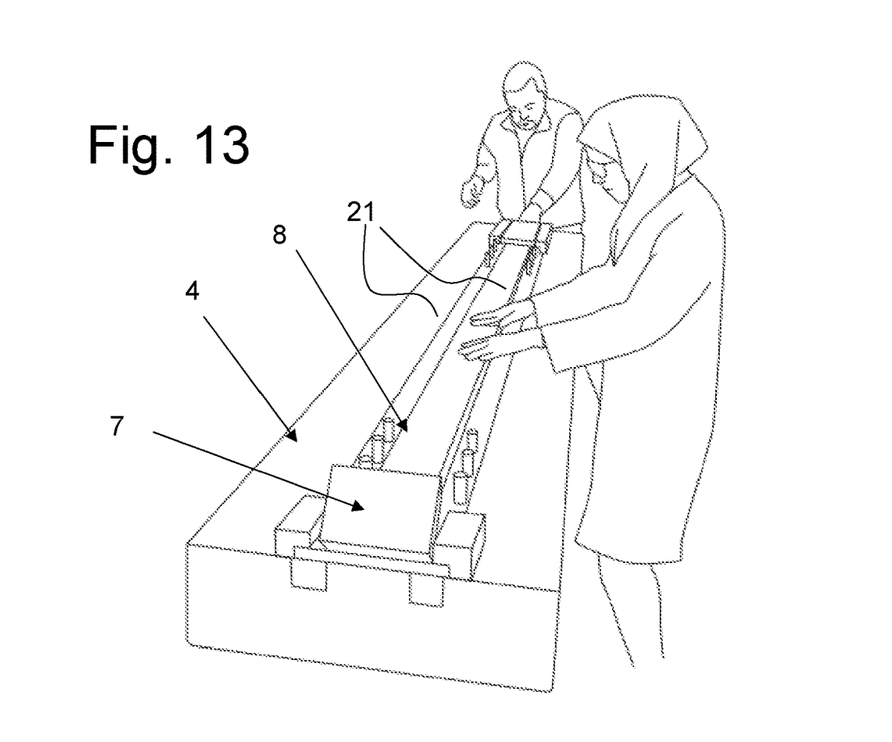
FIG. 13: The CRFP lamella pressed onto the section with the epoxy resin layer, ready to be prestressed in a next stage through the aforementioned procedure.

Once the grooves 22 are cut out, as next step, an epoxy resin 9 is filled into these grooves 22 and on top, a layer of epoxy resin 9 is put on which covers the entire section between the adhesive tapes 21, that is the entire section which is to be covered by the CFRP or GFRP lamella 8. This working step is shown in FIG. 11. For obtaining a regular and plane layer of resin, one does smooth it out with a trowel 23. Then, as next step, the CFRP or GFRP lamella 8 is put to this resin layer 9 as shown in FIG. 12. In FIG. 13, the CFRP or GFRP lamella 8 is laying on the concrete beam 4, that is on the resin 9 layer between the two adhesives tapes 21 and can now be clamped into the clamping devices 7 with its both ends. Then the frames 11 can be placed and by using hydraulic jacks the strip 8 can be prestressed as described to the sequence of pictures of FIG. 7. This entire process can be applied on stationary concrete structures 1 as well as on precast concrete beams 4 and elements.

Figure 14:
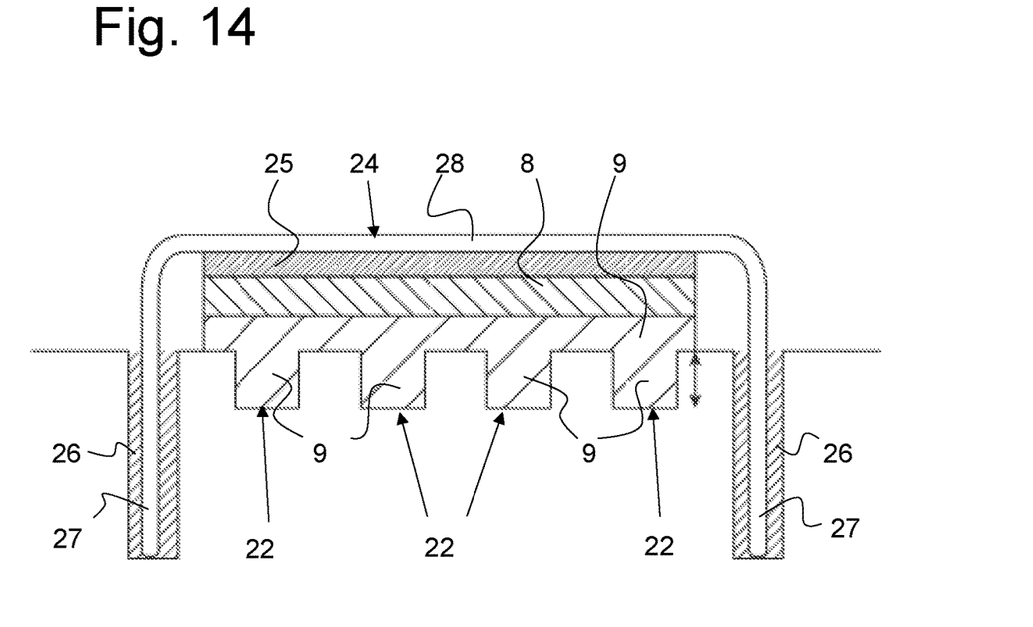
FIG. 14: A U-shaped holding CFRP or GFRP bracket to be placed on the two end sections of the CRFP or GFRP lamella and fixing the same in the concrete or timber structure in epoxy filled holes for holding these end sections tightly on the concrete or timber structure, in a cross sectional view.

FIG. 14 shows the second important measure for achieving a substantial improvement of the strengthening effect. Shown is a U-shaped CFRP or GFRP bracket 24 as holding element 24 to be placed on the two end sections of the CFRP or GFRP lamella 8 and thereby fixing the same on the concrete structure 1, 4. The drawing shows a section view across the CFRP or GFRP lamella 8 which has a width of approx. 100 mm and thickness of approx. 1.2 to 1.4 mm. Below the holding bracket 24, an intermediate layer 25 is shown. The concrete structure 1 is equipped with four grooves 22. They have a width of approx. 5-10 mm and are 5 to 20 mm deep. These grooves 22 are completely filled up with epoxy resin 9, and epoxy resin 9 is also put over the grooves 22 and over the intermediate rips between the actual grooves, so a covering continuous layer of epoxy resin 9 is present. Then comes the CRFP or GFRP lamella 8 tightly pressed onto the resin layer 9. On top of the CFRP or GFRP lamella 8, the small intermediate layer 25 of Teflon allows longitudinal movement of the CFRP or GFRP, but strongly prevents any uplift out-of-plane deformation of the CFRP or GFRP. This small strip 25 can be alternatively made of an epoxy adhesive. The U-shaped holding bracket 24 is ultimately installed as a U-stirrup.

On both sides of the CFRP or GFRP lamella 8, holes 26 have been drilled into the concrete structure 1 with suitable depth and width to receive the legs 27 of the U-shaped holding bracket 24. These holes 26 are filled with epoxy resin 9. The U-shaped holding bracket 24 comprises two legs 27 which form the U together with the connecting intermediate leg 28 between these two legs 27. These legs 27 are pocketed into the holes 26 and submerge into the resin 9. In case the CFRP or GFRP lamella 8 is mounted on a concrete slab 4, the bracket 24 is pressed onto the strip 8 by a supporting post, and if the application is performed on top, e.g. on a concrete beam, the pressing can be achieved by a heavy object, until the resin is cured. After hardening out of the epoxy resin 9 this support or heavy object can be removed and further on, the end sections of the CFRP or GFRP lamellae 8 are tightly pressed against the concrete structure 1, 4. This will prevent any undesired gaps between the U-shaped bracket 24 and the CFRP or GFRP lamella 8, which can effectively prevent any out-of-plane deformation and premature debonding of the prestressed CFRP or GFRP lamella 8 from the concrete substrate.

Figure 15:
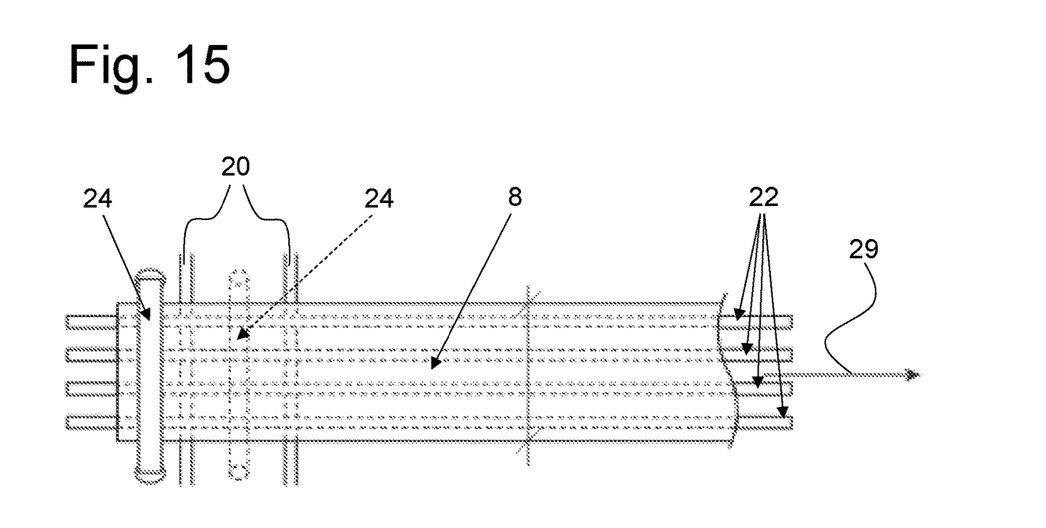
FIG. 15: The end section of a mounted CRFP or GFRP lamella in a top view, with the holding bracket.

FIG. 15 shows the arrangement in a top view. Shown is the CFRP or GFRP lamella 8 with the four grooves 22 underneath, depicted in dotted lines. Furthermore, the U-shaped holding bracket 24 is shown, mounted close to the end of the CFRP or GFRP lamella 8. Of course there can be several U-shaped holding brackets 24 as is indicated a second one with dotted lines and these elements can also have a shape diverting of the ones shown. They can be e.g. flat brackets. Also the material of which these brackets are made of can be selected. Advantageously, these brackets are made of CFRP or GFRP as well, because they are then light weight, small, strong and corrosion resistant. The light weight makes it easier to handle them and they can absorb substantial forces. But these U-shaped holding brackets 24 can also be made of stainless steel or stainless steel plates which can be screwed down onto the end sections of the strips. Eventually, arrow 29 indicates the direction of the prestressing of this CFRP or GFRP lamella 8. It might be useful to arrange one or more grooves 20 which extend across the grooves 22 underneath the CFRP or GFRP lamella 8 as shown in order to prevent the damage initiation in the concrete structure around the area of the end of the grooves 22 and further increase the bonding area.

Figure 16:
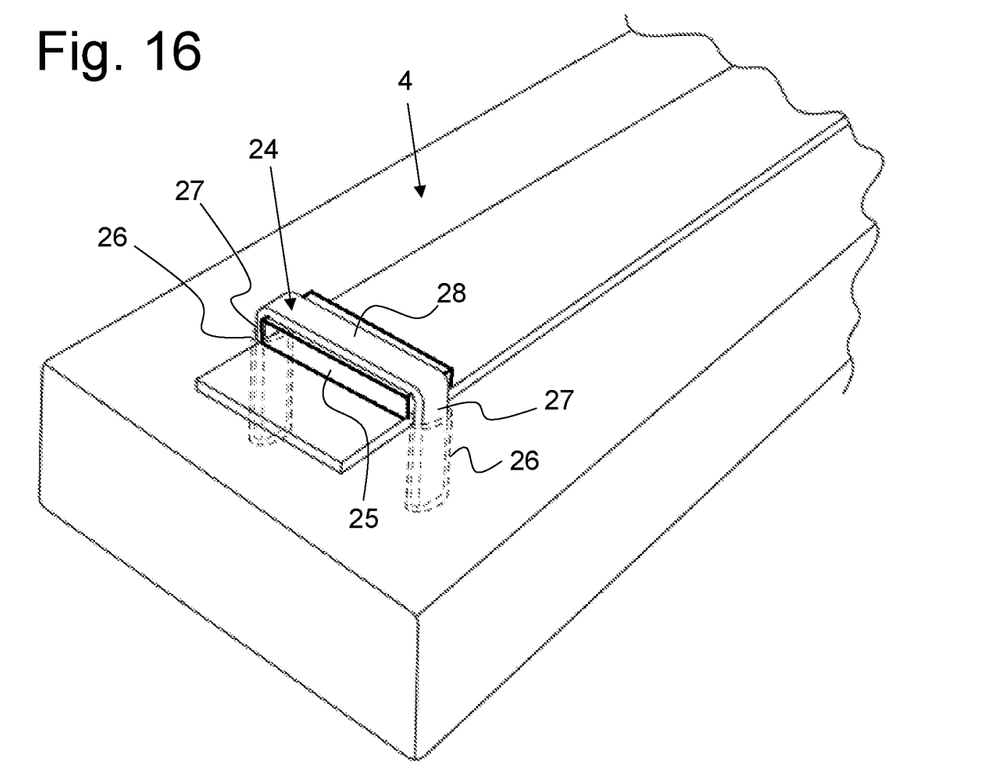
FIG. 16: The complete end section of a prestressed CRFP lamella mounted on a concrete or timber beam or slab, with cut away end and the mounted U-shaped holding bracket.

In FIG. 16, the completed installation of a CFRP or GFRP lamella 8 on a concrete beam 4 is shown in its end section. Close to the very end of the CFRP or GFRP lamella 8, the holding bracket 24 is anchored in the concrete beam 4 by way of holes 26 filled with epoxy resin 9. The two legs 27 are completely submerged in the resin fillings of the holes 26 which receive these legs 27 of the holding bracket 24 while it's intermediate length 28 lays on the intermediate elastic strip 25 which does press onto the CFRP or GFRP lamella 8. On this occasion it is to be mentioned that the entire method and system can also be used on timber and timber structures.

The main purpose of this invention is to firstly increase the transmission of the forces from the CFRP or GFRP lamellae into the concrete or timber structure in general, secondly to omit an anchor plate which was so far necessary, and thirdly to prevent a debonding of the end sections of the CFRP or GFRP lamellae and therefore also to prevent a bending away of these end sections even in case of a fracture of the top layer of the concrete or timber in these sections.

In summary, by using this method and arrangement, the reinforcing effect of CFRP or GFRP lamellae 8 on concrete or timber structures 1, 4 can be improved substantially, allowing higher prestressing forces and also ensuring more secure and longer lifetimes of the applied CFRP- or GFRP strengthening strips.

LIST OF NUMERALS

1 Concrete structure, concrete slab, or timber
2 Dowels and screws for anchor plate 6
3 Dowels and screws for the frame of prestressing device
4 Concrete beam, or timber beam
5 Upper surface of concrete beam
6 Anchor angle profile
7 Clamping device
8 CFRP lamella, GFRP lamella
9 Epoxy resin
10 Anchor plate for prestressed CFRP lamella, no longer necessary with the present invention
11 Frame for prestressing device.
12 Nuts for the screws 3
13 Hydraulic jack
14 Piston of the hydraulic jack
15 Hydraulic oil hose
16 Hydraulic hand pump
17 Distance holding (spacer) blocks
18 Recess in frame 11 for receiving piston 14
19 Distance the piston 14 can move
20 Grooves transverse to the strip
21 Adhesive tapes
22 Grooves in the concrete beam
23 Trowel
24 U-shaped holding element
25 Intermediate layer
26 Holes for receiving legs 27 of U-shaped holding element 24
27 Parallel legs of U-shaped holding element 24
28 Intermediate bar of U-shaped holding element 24
29 Prestressing direction

The invention claimed is:

1. A method for the strengthening of concrete or timber structures, by the application of one or several prestressed Carbon FRP or Glass FRP lamella which are being glued and bonded to the concrete or timber structure using an epoxy resin, the method comprising:
   a) cutting at least one groove into the concrete or timber structure along a direction in which the concrete structure or timber structure is to be strengthened,
   b) filling the at least one groove tightly with epoxy resin and putting on a layer of epoxy resin onto the section area to be equipped with a CFRP or GFRP lamella,
   c) putting on the CFRP or GFRP lamella onto the epoxy layer and pressing the same against the concrete or timber structure,
   d) prestressing the CFRP or GFRP lamella between two clamping devices fixed in the concrete or timber structure by a hydraulic jack by pushing the clamp device away from an anchored frame and inserting distance holders between the clamp device and the anchored frame on each end section of the CFRP or GFRP lamella,
   e) drilling a pair of holes into the concrete or timber structure beside each end section of the CFRP or GFRP lamella, and filling the same with epoxy resin, and putting U-shaped brackets over the two end sections of the CFRP or GFRP lamella by inserting and submerging a first and second U-legs into the epoxy resin filled opposite holes so a third intermediate U-leg tightly lays on the CFRP or GFRP lamella, and pressing the intermediate U-leg onto the CFRP or GFRP lamella until the epoxy resin is hardened out,
   f) after hardening out of the epoxy resin, using the hydraulic jack for again pushing the clamping device away from the frame for removing the spacers, and then releasing the prestress force on both ends of the CFRP or GFRP lamella, and then removing the clamping devices and frames and cutting the end sections of the CFRP or GFRP lamella not glued to the concrete or timber structure or timber structure away.

2. The method according to claim 1, wherein under step d), the prestressing of the CFRP or GFRP lamella is done by the hydraulic jack by pressing its piston toward the clamping device and then securing the same by spacer blocks to later be removed.

3. A concrete structure which is reinforced, retrofitted, or strengthened using the method according to claim 1, wherein the section onto which the CFRP or GFRP lamella is glued and bonded is equipped with at least one groove located within the width of the section and extending in the direction of the CFRP or GFRP lamella, and which at least one groove is entirely filled with epoxy resin and said section is equipped with a layer of epoxy resin, and the end sections of the CFRP or GFRP lamella are in addition tightly held to the concrete or timber structure by down pressing U-shaped brackets anchored in the concrete or timber on both sides of the CFRP or GFRP lamella.

4. The concrete structure according to claim 3, wherein several grooves are located over the width of the section and extending in the direction of the CFRP or GFRP lamella.

5. The concrete structure according to claim 3, wherein the U-shaped holding brackets are made of a CFRP or GFRP.

6. The concrete structure according to claim 3, wherein the U-shaped holding brackets are made of mild steel, stainless steel, or aluminum.

7. The concrete structure according to claim 3, wherein one or more several grooves are at the ends of the CFRP or GFRP lamella in transverse or 45-degrees direction with respect to the CFRP or GFRP lamella direction.

* * * * *